(12) United States Patent
Lee et al.

(10) Patent No.: US 7,694,928 B2
(45) Date of Patent: Apr. 13, 2010

(54) SINK TYPE CUP HOLDER FOR MOTOR VEHICLE

(75) Inventors: Kwang Gi Lee, Gunpo-si (KR); Hyung Sang Park, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 171 days.

(21) Appl. No.: 11/942,403

(22) Filed: Nov. 19, 2007

(65) Prior Publication Data
US 2008/0290125 A1 Nov. 27, 2008

(30) Foreign Application Priority Data
May 22, 2007 (KR) ...................... 10-2007-0049715

(51) Int. Cl.
*A47K 1/08* (2006.01)
(52) U.S. Cl. .................... 248/311.2; 224/281; 224/926
(58) Field of Classification Search ............. 248/311.2, 248/422; 70/110; 296/37.5; 224/926, 282, 224/542, 483
See application file for complete search history.

(56) References Cited

U.S. PATENT DOCUMENTS

| 4,759,584 A | * | 7/1988 | Dykstra et al. | ......... 297/188.16 |
| 7,350,757 B2 | * | 4/2008 | Baek | ........................ 248/311.2 |
| 2007/0221805 A1 | * | 9/2007 | Baek | ........................ 248/311.2 |

FOREIGN PATENT DOCUMENTS

| KR | 10-2002-0026712 | 4/2002 |
| KR | 10-2004-0063357 | 7/2002 |

* cited by examiner

*Primary Examiner*—Gwendolyn Baxter
(74) *Attorney, Agent, or Firm*—Morgan, Lewis & Bockius LLP

(57) ABSTRACT

A cup holder includes: a support housing; an elevator housing, movable within the support housing; a cup bearing tray, movable within the elevator housing; and an elevator unit that moves the elevator housing and the cup bearing tray in opposite directions. The elevator unit includes: a main gear that is linked with the cup bearing tray and is pivotably installed on the support housing, a rack gear that is linked with the elevator housing, and a driven gear that is engaged between the main gear and the rack gear.

5 Claims, 6 Drawing Sheets

SINK TYPE CUP HOLDER FOR MOTOR VEHICLE

CROSS-REFERENCE TO RELATED APPLICATIONS

This application claims priority to Korean Application No. 10-2007-0049715, filed on May 22, 2007, the disclosure of which is incorporated herein by reference.

BACKGROUND OF THE INVENTION

1. Field of the Invention

The present invention relates to a sink type cup holder for a motor vehicle.

2. Description of the Prior Art

In general, a vehicle cup holder is provided between the driver's and passenger's seats. One example of a typical cup holder includes a cup stand that has a toothed support rod, a cup holder fence that surrounds the cup stand, and a cup stand height adjustor that couples the cup stand and the cup holder fence with pinion gears and connecting members such that the cup holder fence is raised when the cup stand is lowered. However, the support rod and the cup stand height adjustor are disposed in what would otherwise be usable cup holder space.

Another typical cup holder has a cup holding space, a cup holder cover that is rotatably installed on the body through a pair of arms, a spring member that is installed on the body so as to press the cup holder cover, and a slider that moves along the body when the cup holder cover is closed or opened. However, the user lowers the cup holder cover, and then places the cup on the body. This preparation delays the process of placing the cup on the body, and detracts the user's attention from driving.

SUMMARY OF THE INVENTION

A cup holder includes: a support housing; an elevator housing, movable within the support housing; a cup bearing tray, movable within the elevator housing; and an elevator unit that moves the elevator housing and the cup bearing tray in opposite directions. The elevator unit includes: a main gear that is linked with the cup bearing tray and is pivotably installed on the support housing, a rack gear that is linked with the elevator housing, and a driven gear that is engaged between the main gear and the rack gear.

The cup bearing tray may include a plate configured for a cup to be placed thereon, and an elevator plate that is coupled to the plate and to the main gear.

The main gear may include a toothed arm that has teeth engaged with teeth of the driven gear and is coupled to the cup bearing tray, and a connecting arm that extends from one end of the toothed arm and is hinged with the support housing.

The cup bearing tray may be connected with the elevator housing by compressive springs.

The cup bearing tray may include at least one hook configured to hook the cup bearing tray to the elevator housing, and the support plate may include at least one sliding piece configured to press a face of the hook to unhook the hook when the cup bearing tray is pressed down. The elevator housing may include at least one hooking hole configured for the hooks to be hooked therein.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF PREFERRED EMBODIMENTS

Figure 1:
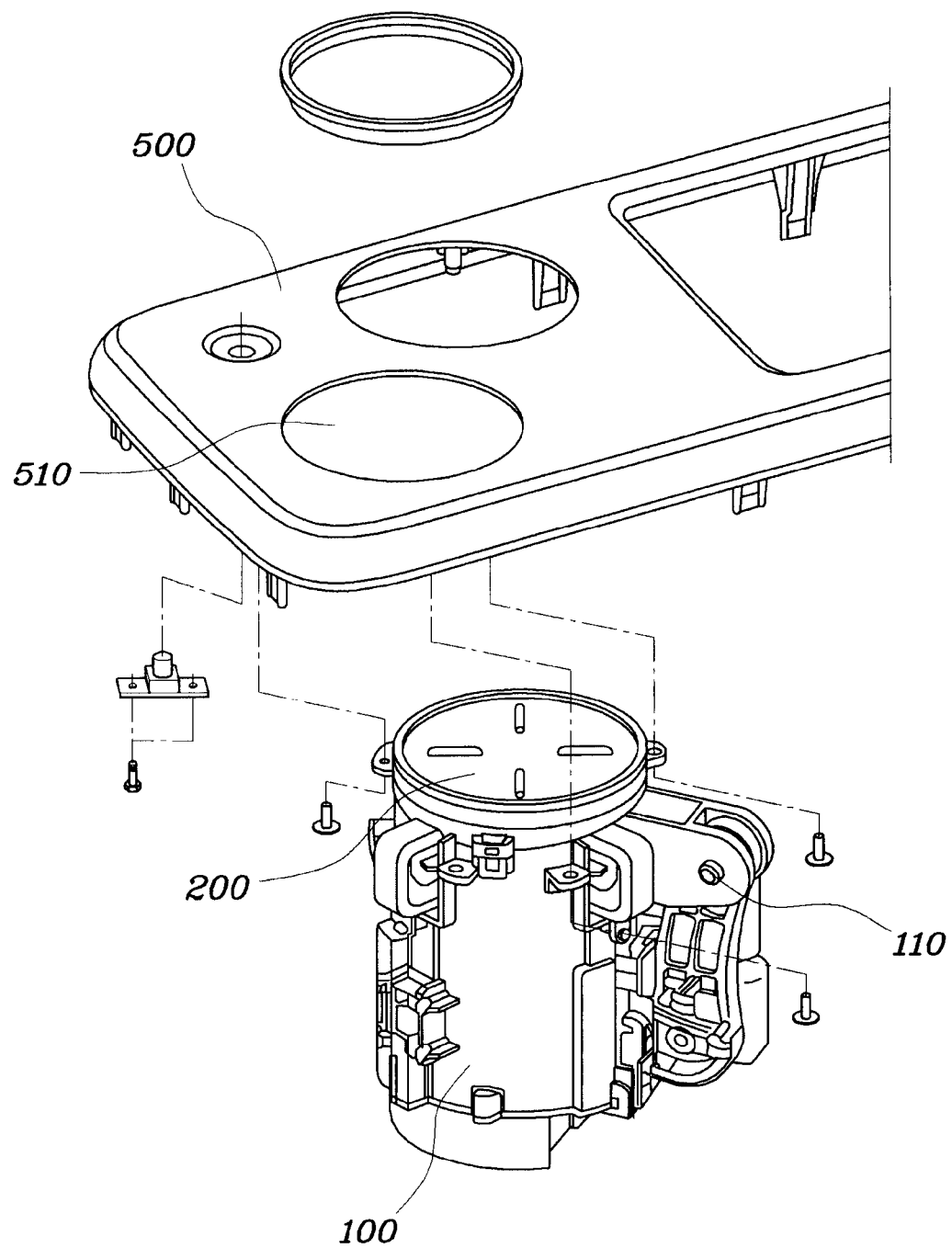
FIG. 1 is a perspective view illustrating a sink type cup holder for a motor vehicle according to an embodiment of the present invention.

Reference will now be made in greater detail to an exemplary embodiment of the invention, an example of which is illustrated in the accompanying drawings. Wherever possible, the same reference numerals will be used throughout the drawings and the description to refer to the same or like parts.

Figure 2:
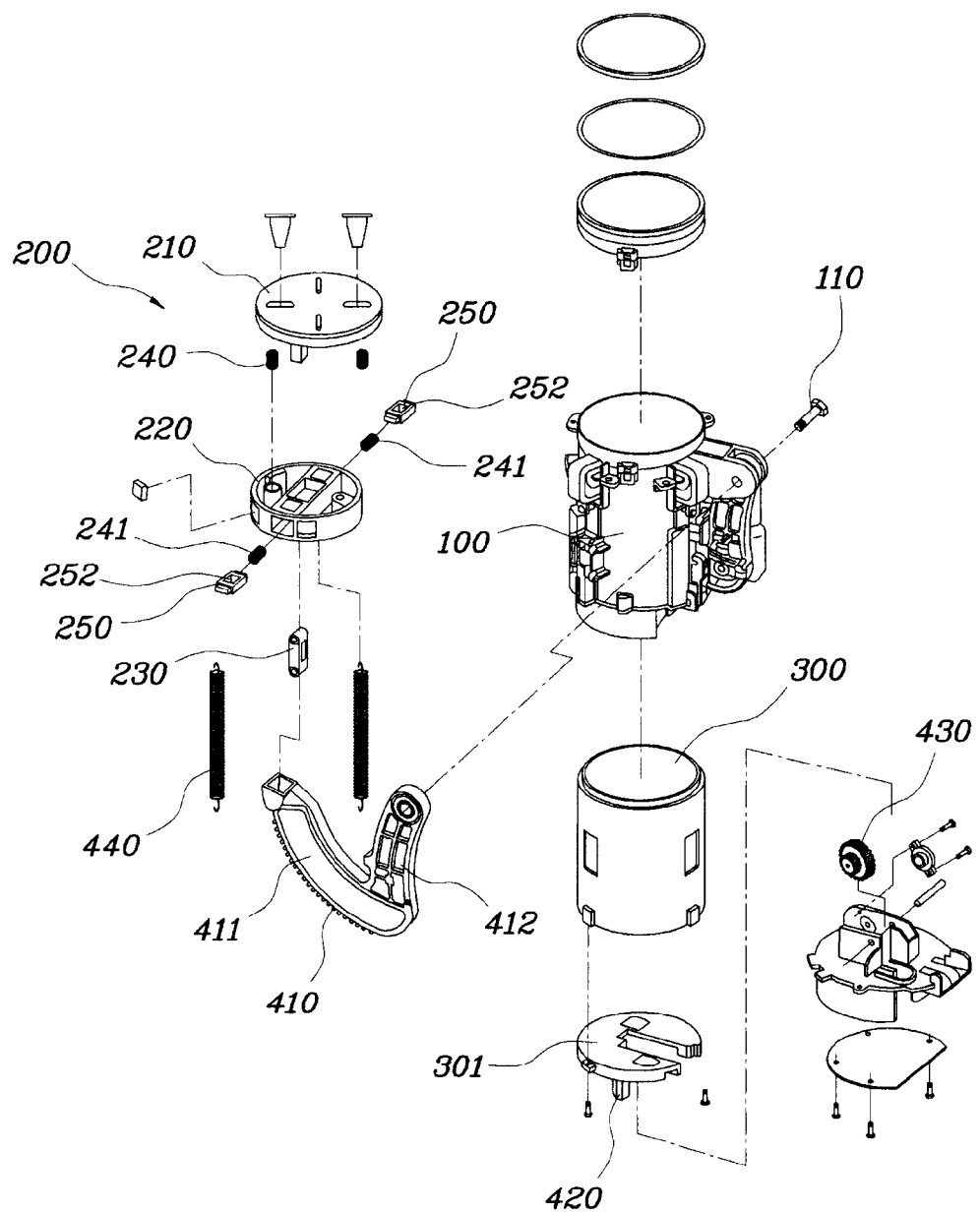
FIG. 2 is an exploded perspective view illustrating a sink type cup holder for a motor vehicle according to an embodiment of the present invention.

As illustrated in FIGS. 1 and 2, a cup holder according to an embodiment of the present invention is mainly disposed between the driver's and passenger's seats, and comprises a support housing 100, a cup bearing tray 200 installed in the support housing 100, an elevator housing 300 disposed between the support housing 100 and the cup bearing tray 200, and an elevator unit 400, which raises the elevator housing 300 when the cup bearing tray 200 is pressed downwards.

More specifically, the support housing 100 is substantially cylindrical, with an open top, and is inserted into a fixing hole 510 of a fixed surface 500, such as a console cover.

Further, the support housing 100 is provided therein with the cup bearing tray 200, on which the cup is to be placed. The elevator housing 300 is mounted between the support housing 100 and the cup bearing tray 200.

The cup bearing tray 200 comprises a support plate 210 on which the cup is to be placed, and an elevator plate 220 disposed under the support plate 210. At least one support spring 240 for elastically supporting the support plate 210 is installed between the support plate 210 and the elevator plate 220. Further, the elevator plate 220 is coupled thereunder with a link member 230 linked with one end of a main gear 410 of the elevator unit 400, which will be described below.

When the user presses the cup down on the top surface of the support plate 210, the link member 230 transmits the force of the cup bearing tray 200, lowered by the cup, to the elevator unit 400, so that the elevator housing 300 is raised. When the raised elevator housing 300 moves down, the force is transmitted to the elevator unit 400, and then to the elevator plate 220, so that the cup bearing tray 200 is raised.

The elevator housing 300 has the shape of a hollow cylinder, and is disposed between the support housing 100 and the cup bearing tray 200. The top surface 301 of a bottom member of the elevator housing 300 is coupled with a lower surface of the cup bearing tray 200 by a compressive spring 440. Further, when the cup bearing tray 200 is pressed, the elevator housing 300 is raised to define a place 320 (FIGS. 3-4) for placing the cup. To this end, the elevator housing 300 is coupled with the elevator unit 400 in a drivable manner.

The elevator unit 400 serves to transmit force between the cup bearing tray 200 and the elevator housing 300. In other words, the elevator unit 400 comprises the main gear 410 that is linked to the cup bearing tray 200 at one end thereof and is hinged with the support housing 100 at the other end thereof, a rack gear 420 that extends downward below the cup bearing tray 200 and a driven gear 430 that is engaged between the main gear 410 and the rack gear 420.

Particularly, the main gear 410 comprises an toothed arm 411 linked with the cup bearing tray 200, and an connecting arm 412 extending from one end of the toothed arm 411 and hinged with the support housing 100 through a pivot pin 110. The toothed arm 411 is engaged with the teeth of the driven gear 430 on one side thereof.

The operation of the sink type cup holder for a motor vehicle according to an embodiment of the present invention will be described below.

Figure 3:
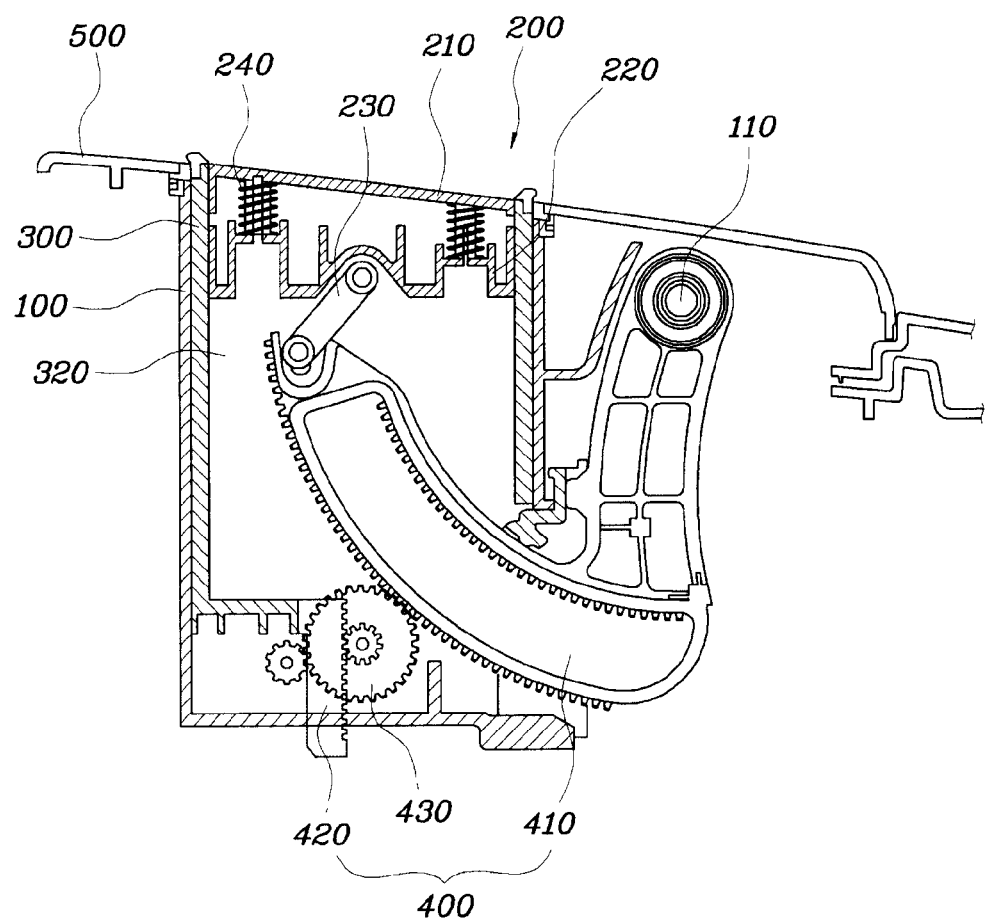
FIG. 3 is a view illustrating a pre-operation state of a sink type cup holder for a motor vehicle according to an embodiment of the present invention.

As illustrated in FIG. 3, before the cup holder operates, the top surface of the cup bearing tray 200 and the upper end of the elevator housing 300 are flush with the top surface of the fixed plate 500.

Figure 4:
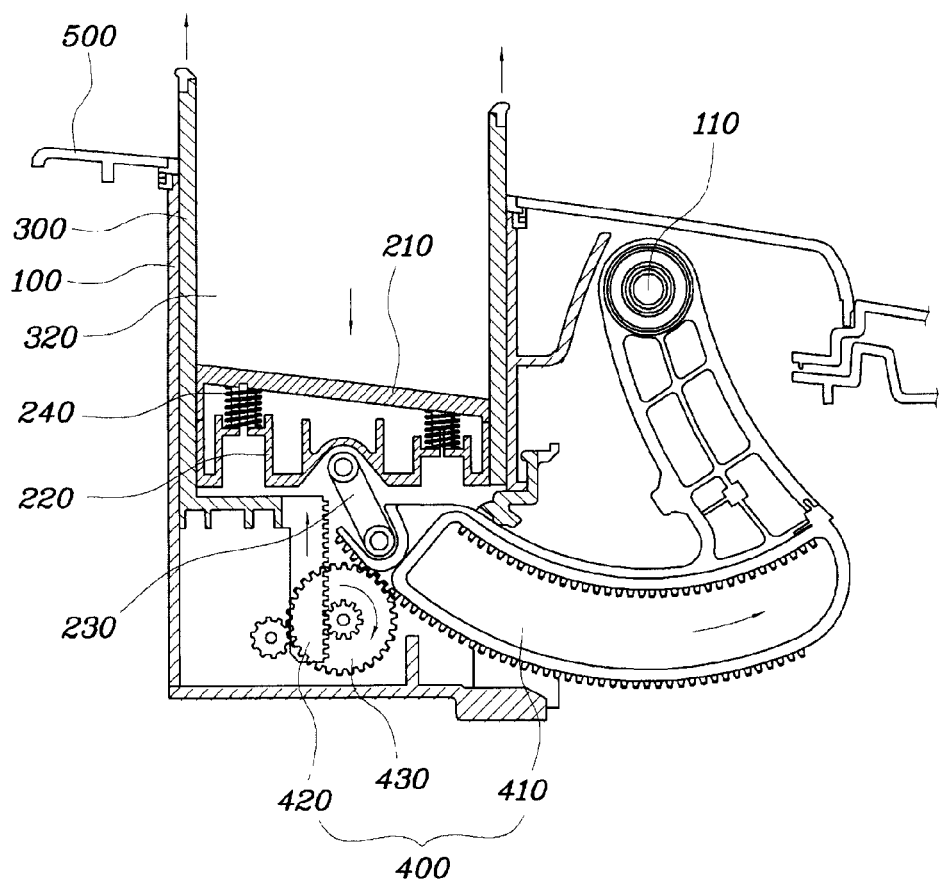
FIG. 4 is a view illustrating a post-operation state of a sink type cup holder for a motor vehicle according to an embodiment of the present invention.

As illustrated in FIG. 4, when a user presses the top surface of the cup bearing tray 200 with his/her hand or through the cup, the cup bearing tray 200 is lowered, and the link 230 transmits the force to the elevator unit 400. The elevator unit 400 moves the elevator housing 300 upward using the force of the cup bearing tray 200 moving downward, so that the space 320 for placing the cup is defined in the elevator housing 300.

In other words, the cup bearing tray 200 is lowered, and thus the link member 230 causes the main gear 410 of the elevator unit 400 to rotate counterclockwise in the drawings about the pivot pin 110. In this manner, as the main gear 410 rotates, the driven gear 430, which is engaged with the teeth of the main gear 410, rotates clockwise. The rotation of the driven gear 430 causes the rack gear 420, which is engaged with the driven gear 430, to move upwards. As a result, the elevator housing 300 moves upwards, and thus the space 320 for placing the cup is defined in the elevator housing 300.

After the cup is removed from the space 320, the elevator housing 300, which protrudes upwards, is pressed down. Then, the rack gear 420 of the elevator housing 300 moves downward, and thereby the driven gear 430 rotates counterclockwise. At the same time, the main gear 410 rotates clockwise, and thus the cup bearing tray 200 moves upwards. Consequently, the downward movement of the elevator housing 300 causes the cup bearing tray 200 to move upwards. The parts return to their original positions, as illustrated in FIG. 3.

If the cup bearing tray 200 were raised beyond its original position, the cup bearing tray 200 would be separated from the elevator housing 300. To prevent this separation, the cup bearing tray 200 can be provided with at least one hook 250 for hooking the cup bearing tray 200 on the elevator housing 300.

Figure 5:
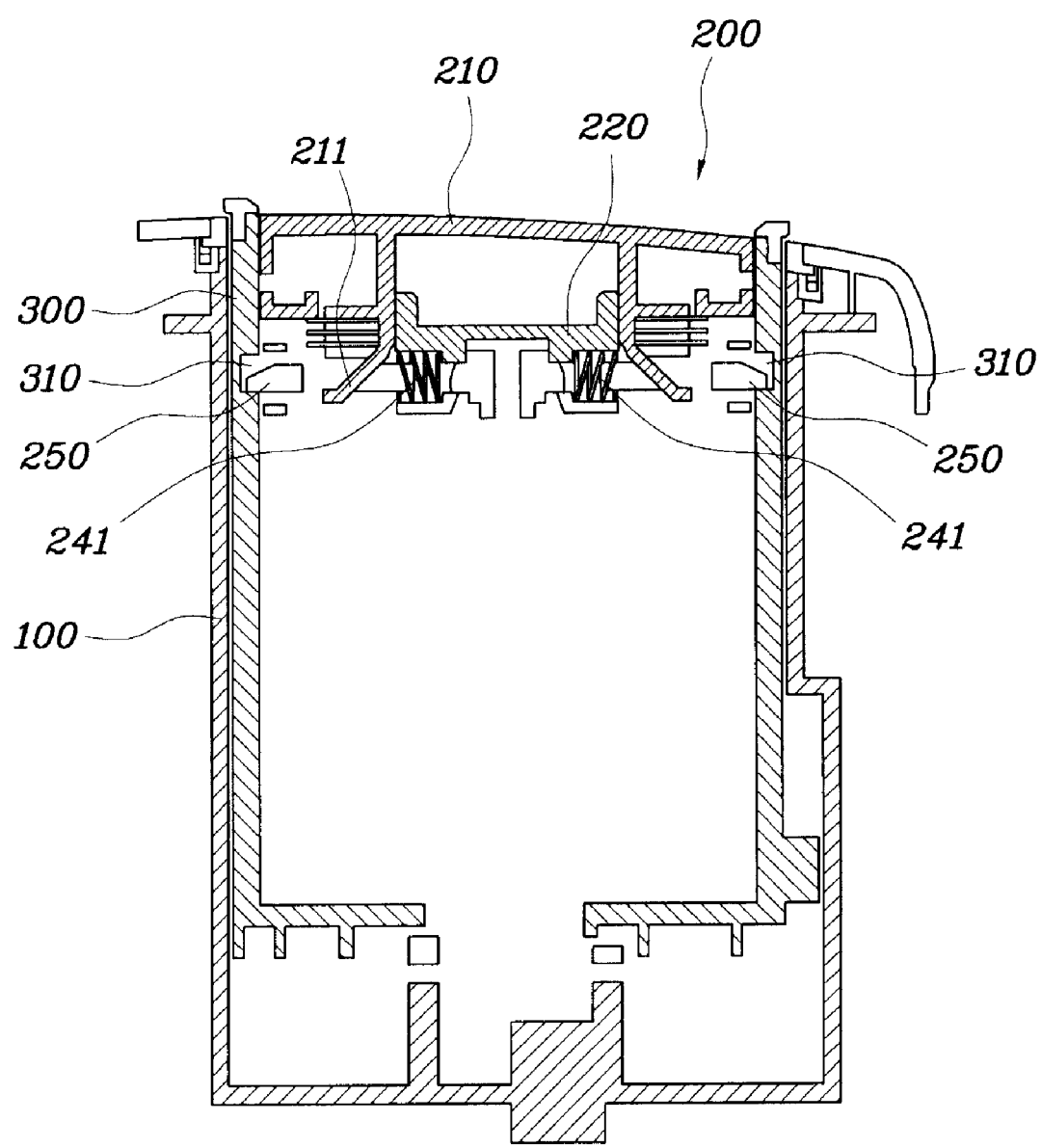
FIG. 5 is a partial sectional view illustrating a pre-operation, hooked state of a sink type cup holder for a motor vehicle according to an embodiment of the present invention.
Figure 6:
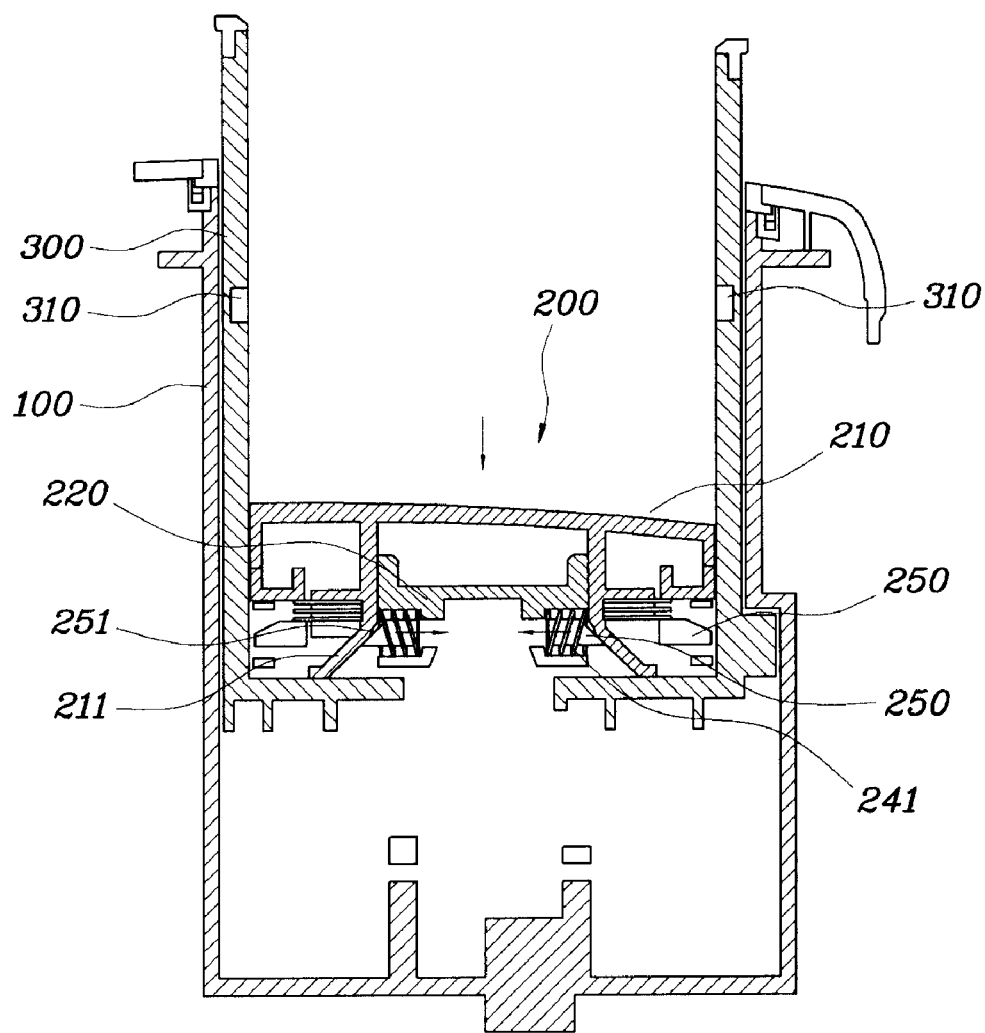
FIG. 6 is a partial sectional view illustrating a post-operation, unhooked state of a sink type cup holder for a motor vehicle according to an embodiment of the present invention.

As illustrated in FIGS. 5 and 6, the cup bearing tray 200 is provided therein with at least one hook 250, which hooks the elevator housing 300 in an elastically supported state.

Specifically, the support plate 210 of the cup bearing tray 200 is provided thereunder with sliding pieces 211, which protrude outward, and the elevator plate 220 is provided with the hooks 250, which move toward the center of the cup bearing tray 200 by pressing the sliding pieces 211 when the support plate 210 is lowered. Each hook 250 is supported by a spring.

Further, each hook 250 has an insertion hole 252 into or out of which each sliding piece 211 moves, and is provided with an inclined internal face 251 which each sliding piece 211 presses while sliding. The elevator housing 300 is provided with hooking holes 310, in which the ends of the hooks 250 are hooked and fixed, at positions facing the ends of the hooks 250.

Hereinafter, the procedures of hooking and unhooking the cup bearing tray in and from the elevator housing in conjunction with the operation of the sink type cup holder will be described below.

First, before the cup holder is operated, the top surface of the cup bearing tray 200 and the upper end of the elevator housing 300 are flush with the top surface of the fixed plate 500. In this state, the hooks 250 are hooked in the hooking holes 310, as illustrated in FIG. 5.

As illustrated in FIG. 6, when the user presses the top surface of the cup bearing tray 200 to lower the cup bearing tray 200, the sliding pieces 211 of the support plate 210 compress the support springs 240, and press the inclined faces 251 of the hooks 250, moving the hooks 250 toward the center of the cup bearing tray 200.

In this state, the hooks 250 are separated from the hooking holes 310. This separation of the hooks 250 allows the cup bearing tray 200 to move relative to the elevator housing 300.

Then, when the user presses the upper portion of the elevator housing 300, which protrudes upwards, the cup bearing tray 200 is raised, and thus the hooks 250 of the cup bearing tray 200 reach the hooking holes 310 of the elevator housing 300. Accordingly, as illustrated in FIG. 5, the hooks 250 are hooked in the hooking holes 310.

As described above, in the sink type cup holder for a motor vehicle according to an embodiment of the present invention, when the cup bearing tray 200 is pressed, the elevator housing 300 surrounding the cup bearing tray 200 is raised to define the space 320 for placing the cup therein. Thereby, placing the cup in the cup holder is rapidly carried out, and the spatial utility of the height direction is high. Further, the space for placing the cup is provided only when the cup is placed therein, so that the internal space of the motor vehicle is effectively used, and the external appearance can be improved.

Although preferred embodiments of the present invention have been described for illustrative purposes, those skilled in the art will appreciate that various modifications, additions and substitutions are possible, without departing from the scope and spirit of the invention as defined in the accompanying claims.

What is claimed is:

1. A cup holder, comprising:
   a support housing;
   an elevator housing, movably disposed in the support housing;
   a cup bearing tray, movably disposed in the elevator housing; and an elevator unit for moving the elevator housing and the cup bearing tray in substantially opposite directions, and comprising:
a main gear that is linked with the cup bearing tray and is pivotably installed on the support housing;
a rack gear that is linked with the elevator housing; and
a driven gear that is engaged between the main gear and the rack gear;
wherein the main gear comprises a toothed arm that has teeth engaged with teeth of the driven gear and is coupled to the cup bearing tray, and a connecting arm that extends from one end of the toothed arm and is hinged with the support housing.

2. The cup holder as set forth in claim 1, wherein the cup bearing tray comprises a plate configured for a cup to be placed thereon, and an elevator plate that is coupled to the plate and to the main gear.

3. The cup holder as set forth in claim 1, wherein the cup bearing tray is connected with the elevator housing by compressive springs.

4. The cup holder as set forth in claim 1,
wherein the cup bearing tray comprises at least one hook comprising a face and configured to hook the cup bearing tray to the elevator housing; and
wherein a support plate comprises at least one sliding piece configured to press the face to unhook the hook when the cup bearing tray is pressed down.

5. The cup holder as set forth in claim 4, wherein the elevator housing comprises at least one hooking hole configured for the hooks to be hooked therein.

* * * * *